(12) United States Patent
Takechi et al.

(10) Patent No.: US 6,235,431 B1
(45) Date of Patent: May 22, 2001

(54) NONAQUEOUS ELECTROLYTIC SOLUTION FOR BATTERY AND NONAQUEOUS ELECTROLYTIC SOLUTION BATTERY USING THE SAME

(75) Inventors: Kensuke Takechi; Tohru Shiga, both of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/102,008

(22) Filed: Jun. 22, 1998

(30) Foreign Application Priority Data

Jun. 24, 1997 (JP) ................................................ 9-166762
Sep. 24, 1997 (JP) ................................................ 9-258166

(51) Int. Cl.[7] ...................................................... H01M 6/14
(52) U.S. Cl. ......................................... 429/302; 429/307
(58) Field of Search .................................. 429/306, 307, 429/302, 334, 325, 336, 339, 207; 252/62.2

(56) References Cited

U.S. PATENT DOCUMENTS 3,511,716 * 5/1970 Gabano et al. .
5,631,106 * 5/1997 Dahn et al. .
5,916,707 * 6/1999 Omaru et al. .
6,077,628 * 6/2000 Takechi et al. .

FOREIGN PATENT DOCUMENTS 4-284372    10/1992  (JP) .
5-242884  * 9/1993   (JP) .
7-122297     5/1995  (JP) .
10-241745 * 9/1998   (JP) .

OTHER PUBLICATIONS

Tarascon et al. (Solid State Ionics vol. 69, pp. 293–305) No Month Available, 1994.*

* cited by examiner

Primary Examiner—Carol Chaney
Assistant Examiner—Susy Tsang
(74) Attorney, Agent, or Firm—Oblon, Spivak, McClelland, Maier & Neustadt, P.C.

(57) ABSTRACT

Disclosed are a nonaqueous electrolytic solution for a battery comprising a supporting electrolyte which can react with water to produce a hydrogen halide and a specific organic compound capable of reacting with water to decompose it for preventing acid generation, and a nonaqueous electrolytic solution battery comprising the same.

16 Claims, 4 Drawing Sheets

NONAQUEOUS ELECTROLYTIC SOLUTION FOR BATTERY AND NONAQUEOUS ELECTROLYTIC SOLUTION BATTERY USING THE SAME

FIELD OF THE INVENTION

The present invention relates to a nonaqueous electrolytic solution for a battery and a nonaqueous electrolytic solution battery. More particularly, the present invention relates to a secondary lithium battery comprising a nonaqueous electrolytic solution containing a predetermined halogen compound as a supporting electrolyte. Even more particularly, the present invention relates to a nonaqueous electrolytic solution for a battery which is arranged to prevent the production of hydrogen halide due to inevitable inclusion of a small amount of water content and a nonaqueous electrolytic solution battery comprising such a nonaqueous electrolytic solution.

BACKGROUND OF THE INVENTION

A nonaqueous electrolytic solution battery comprising lithium or a compound thereof as an active electrode material and therefore an organic solvent dissolving a supporting electrolyte therein as an electrolytic solution has been noted for its usefulness as a primary battery as a small-sized power supply for electronic parts or a secondary battery or lithium ion battery for electric automobiles.

Referring further to such a nonaqueous electrolytic solution battery, as the supporting electrolyte there is often used, e.g., halide such as $LiPF_6$. However, if the electrolytic solution, which is supposed to be nonaqueous, inevitably contains some water content or has adsorbed water from other battery materials, the following reaction (1) takes place to produce a hydrogen halide such as hydrogen fluoride HF.

$$LiPF_6 + H_2O \rightarrow 2HF + LiF + POF_3 \qquad (1)$$

Hydrogen fluoride deteriorates materials constituting the battery, causing further deterioration of battery properties. It is also known that the foregoing reaction (1) is accelerated at high temperatures. Therefore, these problems become remarkable when the nonaqueous electrolytic solution battery is used as a secondary battery for electric automobiles which must operate stably at a temperature of from −30° C. to 60° C. Thus, it is said that a nonaqueous electrolytic solution battery comprising $LiPF_6$ as a supporting electrolyte can hardly be applied to such a use.

In order to overcome these difficulties, some proposals have been made. For example, JP-A-4-284372 (The term "JP-A" as used herein means an "unexamined published Japanese patent application"), which concerns an improvement in a nonaqueous electrolytic solution secondary battery, proposes that an oxide selected from the group consisting of $Al_2O_3$, MgO and BaO, if incorporated in a nonaqueous electrolytic solution containing $LiPF_6$ as a supporting electrolyte, adsorbs hydrogen fluoride produced in the electrolytic solution so that hydrogen fluoride is removed from the reaction system.

JP-A-7-122297, which concerns an improvement in a nonaqueous electrolytic solution battery, proposes that an acid anhydride (e.g., acetic anhydride), if incorporated in a nonaqueous electrolytic solution containing $LiPF_6$ as a supporting electrolyte, previously catches water in the electrolytic solution to inhibit the foregoing reaction (1).

However, the above cited JP-A-4-284372 has some disadvantages. In accordance with duplicate experiments of the foregoing patent made by the present inventors, on the addition of some oxides to the extent within an actually acceptable amount for a battery, the removal of hydrogen fluoride proceeds too slowly to keep pace with the production of hydrogen fluoride. Accordingly, the foregoing proposal cannot effectively inhibit the deterioration of battery due to hydrogen fluoride.

On the other hand, the above cited JP-A-7-122297 exerts a high dehydration effect by an acid anhydride. As a result, however, an acid derived from the acid anhydride is produced. In other words, the foregoing proposal merely contemplates the substitution of other acids for hydrogen halide. Acetic acid or the like is relatively weaker than hydrogen halide but still deteriorates an electrolytic solution and battery can. Accordingly, the foregoing proposal provides no essential solution to the problems of the prior art.

SUMMARY OF THE INVENTION

It is therefore an object of the present invention to provide an effective prevention of hydrogen halide formation in a nonaqueous electrolytic solution for a battery containing a supporting electrolyte which can react with water to produce a hydrogen halide, and a nonaqueous electrolytic solution battery using the same.

It is another object of the present invention to prevent the occurrence of the foregoing secondary problems of the prior art.

It is further object of the present invention to provide a nonaqueous electrolyte battery having a longer life and an excellent high-temperature stability.

These and other objects of the present invention will become more apparent from the following detailed description and examples.

The inventors made studies of dehydrating agents for eliminating water content that causes the production of a hydrogen halide. As a result, the inventors found that specific organic compounds, particularly a group of specific organosilicon compounds and a group of specific acetal compounds are useful for the solution to the accomplishment of the foregoing objects. Thus, the present invention has been worked out. Embodiments of the present invention will be given below.

(1) A nonaqueous electrolytic solution for a battery, comprising an organic solvent which could contain water, a supporting electrolyte which can react with water to produce a hydrogen halide, and an organosilicon compound having an Si-N bond, which reacts with said water and said hydrogen halide to decompose them.

(2) A nonaqueous electrolytic solution for a battery, comprising an organic solvent which could contain water, a supporting electrolyte which can react with water to produce a hydrogen halide, and an acetal compound which reacts with said water to decompose it.

(3) A nonaqueous electrolytic solution battery, comprising an active electrode material of lithium or a compound thereof and a nonaqueous electrolytic solution according to the foregoing embodiment (1) or (2).

In accordance with the foregoing embodiment (1), even if a small amount of water is incorporated into the nonaqueous electrolytic solution or a free hydrogen halide is produced in the nonaqueous electrolytic solution by the reaction of the water with the supporting electrolyte, the water and the hydrogen halide react with the organosilicon compound so that they are decomposed. This effect is exerted also in the embodiment (3).

This organosilicon compound reacts with water or a hydrogen halide very rapidly. Thus, the present invention is not liable to disadvantages due to the lower rate of reaction as in the above cited JP-A-4-284372. Further, the present invention is not liable to the disadvantage that other harmful substances are secondarily produced as in the above cited JP-A-7-122297.

In accordance with the foregoing embodiments (2) and (3), even if a small amount of water is incorporated into the nonaqueous electrolytic solution, the water reacts with the acetal compound so that it is decomposed.

This acetal compound reacts with water very rapidly. Thus, the present invention is not liable to disadvantages due to the lower rate of reaction as in the above cited JP-A-4-284372. Further, in the present invention, the acetal compound and water react with each other as represented by the formula (VII) given later to give a product which is harmless to the battery properties. Thus, the present invention is not liable to the disadvantage that other harmful substances are secondarily produced as in the above cited JP-A-7-122297.

Thus, despite of the use of a supporting electrolyte which can react with water to produce an acid, the nonaqueous electrolytic solution for a battery of the present invention is not liable to deterioration of the materials constituting the battery or the battery properties even if the nonaqueous electrolytic solution has water incorporated therein.

BRIEF DESCRIPTION OF THE DRAWINGS

By way of example and to make the description more clear, reference is made to the accompanying drawings in which.

DETAILED DESCRIPTION OF THE INVENTION

Figure 1:
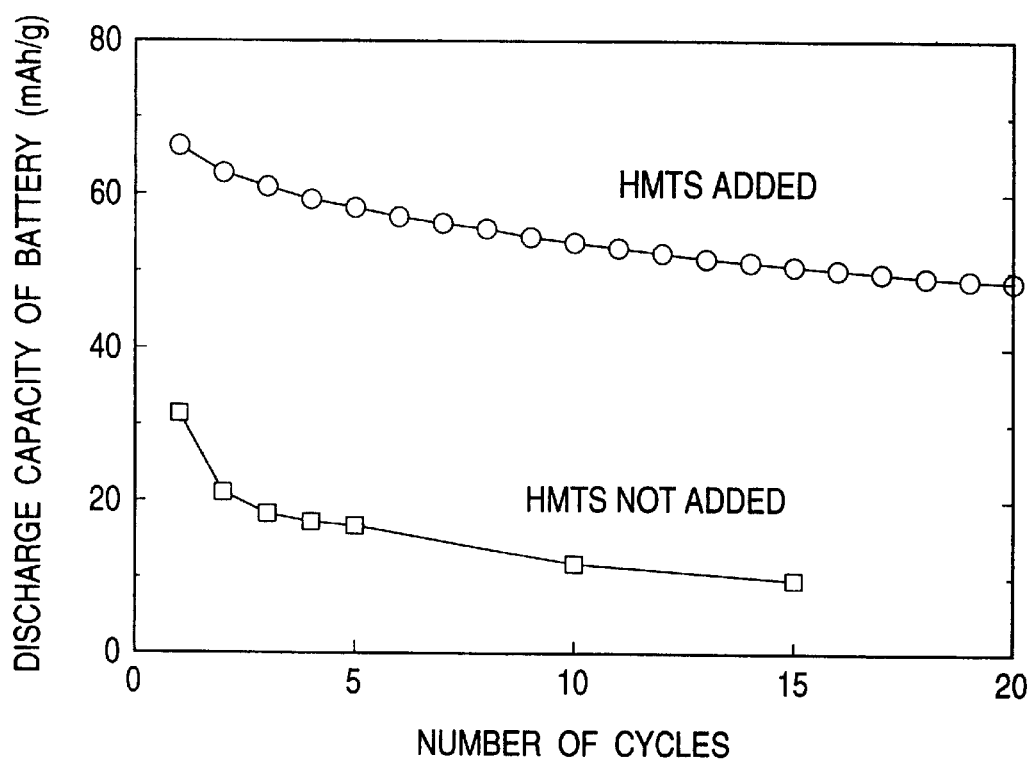
FIG. 1 is a diagram illustrating the charge-discharge cycle characteristics of an example of the present invention and a comparative example.

Embodiments of the present invention will be described hereinafter.
1. Object of the present invention As a rule, all nonaqueous electrolytic solutions for batteries containing a supporting electrolyte which can react with water to produce a hydrogen halide and nonaqueous batteries comprising such nonaqueous electrolytic solutions can be objects of the present invention. At present, batteries comprising at least lithium or a compound thereof as either an active positive or negative electrode material, i.e., so-called "lithium batteries" predominate in nonaqueous electrolytic solution batteries.

Examples of these lithium batteries as objects of the present invention include lithium battery (primary battery) comprising lithium as a negative electrode and manganese dioxide, zinc fluoride, copper oxide, thionyl chloride or the like as a positive electrode, lithium storage battery (secondary battery) comprising lithium or an alloy thereof incorporated as a negative electrode and activated carbon, titanium disulfide, molybdenum disulfide or the like as a positive electrode, and lithium ion battery comprising a carbon material capable of occluding/releasing lithium ion as a negative electrode and a lithium transition metal compound as a positive electrode.

Any batteries, even if not lithium batteries as mentioned above, can be nonaqueous electrolytic solution batteries to which the present invention can be applied so far as the foregoing problems of the prior art occur.
2. Supporting electrolyte A supporting electrolyte is a material to be incorporated in a nonaqueous electrolytic solution for a battery for the purpose of enhancing the electrical conductivity of the electrolytic solution and hence efficiently effecting charge/discharge of the battery. Well known supporting electrolytes are $LiPF_6$, $LiBF_4$ and $LiClO_4$, but the present invention is not limited thereto. Other examples of supporting electrolytes include an ordinary supporting electrolyte, e.g., $LiAsF_6$, which can slightly react with water to produce a hydrogen halide such as hydrogen fluoride.
3. Organic solvent in nonaqueous electrolytic solution for battery The kind of the organic solvent to be used for the nonaqueous electrolytic solution for a battery is not limited unless significantly mismatched with the supporting electrolyte. Examples of the organic solvent employable herein include ethylene carbonate (EC), propylene carbonate (PC), diethyl carbonate (DEC), dimethyl carbonate, dimethoxy ethane, and γ-butyrolactone. Two or more of these organic solvents may be used in admixture.
4. Organosilicon compound having Si-N bond The organosilicon compound having an Si-N bond of the present invention is rich in the reactivity with water or a hydrogen halide and undergoes Si-N bond cleavage to decompose water or a hydrogen halide. The resulting decomposition product is harmless to the battery properties. This organosilicon compound is an organic compound and thus has an affinity for nonaqueous electrolytic solutions. The term "organosilicon compound having an Si-N bond" as used herein is meant to indicate an organosilicon compound having an Si-N bond in the form of, e.g., Si-N-Si bond, not to mention those having a single or a plurality of Si-N bonds per molecule.

Representative examples of the organosilicon compound having an Si-N bond include an organosilazane compound and an organodisilazane compound. However, the present invention is not limited to these organosilicon compounds. Any organic compounds having an Si-N bond can be used regardless of its molecular structure. These compounds may be used singly. Alternatively, two or more of these compounds may be used.

Examples of the organosilazane compound include (N, N-diethylamino)trimethylsilane having one Si-N bond per molecule, N,O-bis(trimethylsilyl)acetamide having one Si-N bond per molecule, and N, N'-bis(trimethylsilyl)-1, 4-butanediamine having a plurality of Si-N bonds per molecule. By way of example, the formula (II) of reaction of (N,N-diethylamino)trimethylsilane with water and the formula (III) of reaction of (N, N-diethylamino)trimethylsilane with a hydrogen halide HX will be given below.

(II)

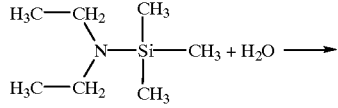 + H$_2$O ⟶

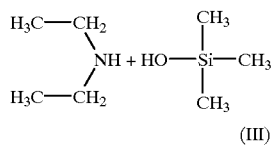

(III)

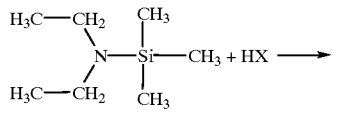 + HX ⟶

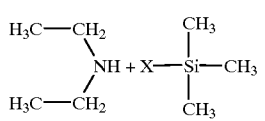

Examples of other types of organosilazane compounds called organodisilazane compound and organotrisilazane compound include 1,1,1,3,3,3-hexamethyldisilazane, and 1,1,3,3,5,5-hexamethylcyclotrisilazane. By way of example, the formula (IV) of reaction of 1,1,1,3,3,3-hexamethyldisilazane with water and the formula (V) of reaction of 1,1,1,3,3,3-hexamethyldisilazane with a hydrogen halide HX will be given below.

(IV)

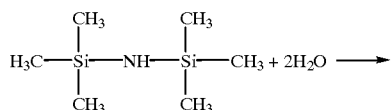 + 2H$_2$O ⟶

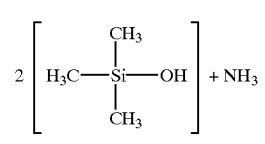 + NH$_3$ (V)

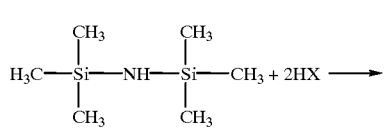 + 2HX ⟶

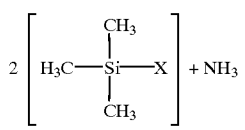 + NH$_3$

The amount of the organosilicon compound having an Si-N bond to be incorporated in the nonaqueous electrolytic solution is preferably not less than 1 mmol/l for the reason that the water content in the nonaqueous electrolytic solution is normally not less than about 1 mmol/l. From the standpoint of the effect of the present invention, there is not upper limit of the added amount of the organosilicon compound having an Si-N bond. However, the added amount of the organosilicon compound having an Si-N bond preferably doesn't exceed 0.5 mol/l to avoid the reduction of the electric conductivity of the nonaqueous electrolytic solution.

There is no restriction to the method for the incorporation of the organosilicon compound of the present invention. For example, the organosilicon compound of the present invention may be added to the nonaqueous electrolytic solution before the assembly of the battery elements or may be injected into the battery can before sealing of the battery can after the assembly of the battery elements. How the organosilicon compound thus added should be dispersed in the nonaqueous electrolytic solution is not specifically limited.

5. Acetal compound

The term "acetal compound" as used herein is meant to indicate a group of compounds represented by the following Ego general formula (VI) which is rich in the reactivity with water and thus is capable of rapidly decomposing water.

(VI)

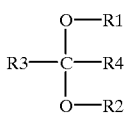

wherein R$_1$ and R$_2$ may be the same or different and each represent a hydrocarbon group having at least one carbon atom; and R$_3$ and R$_4$ may be the same or different and each represent a hydrocarbon group having at least one carbon atom (e.g., phenyl group), an amino group or an alkylamino group (e.g., dimethylamino group) if the acetal compound is of orthoketone type, or one of R$_3$ and R$_4$ is a hydrogen atom and the other is a hydrocarbon group having at least one carbon atom, an amino group or an alkylamino group if the acetal compound is of orthoaldehyde type. In the general formula (VI), the number of carbon atoms for the hydrocarbon group is not particularly restricted, but it is preferably 10 or less carbon atoms from the standpoint of affinity for nonaqueous electrolytic solutions. These acetal compounds contain hydrocarbon groups or alkylamino groups in their molecules and thus have an affinity for nonaqueous electrolytic solutions.

Preferred among these acetal compounds is an orthoaldehyde type acetal compound from the standpoint of high reactivity with water. In this case, an amidacetal type acetal compound wherein one of R$_3$ and R$_4$ which is not a hydrogen atom is an alkylamino group is more desirable for the reason that it has a particularly high reactivity with water. Specific preferred examples of the acetal compound include N,N-dimethylformamidedimethylacetal, and N,N-dimethylformamidedicyclohexylacetal.

Any of these acetal compounds may be used singly. Alternatively, two or more of these acetal compounds may be used in combination.

The formula (VII) of reaction of N,N-dimethylformamidedimethylacetal as an acetal compound with water will be given below.

(VII)

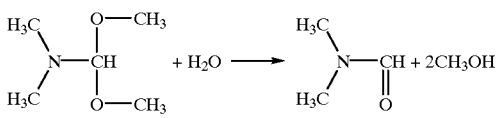

The amount of the acetal compound to be incorporated in the nonaqueous electrolytic solution is preferably not less than 1 mmol/l for the reason that the water content in the nonaqueous electrolytic solution is normally not less than about 1 mmol/l. From the standpoint of the effect of the present invention, there is not upper limit of the added amount of the acetal compound. However, the added amount of the acetal compound preferably doesn't exceed 0.5 mol/l to avoid the reduction of the electric conductivity of the nonaqueous electrolytic solution.

There is no restriction to the method for the incorporation of the acetal compound of the present invention. For example, the acetal compound of the present invention may be added to the nonaqueous electrolytic solution before the assembly of the battery elements or may be injected into the battery can before sealing of the battery can after the assembly of the battery elements. How the acetal compound thus added should be dispersed in the nonaqueous electrolytic solution is not specifically limited.

6. Positive electrode in nonaqueous electrolytic solution battery

Since the positive electrode is not a main part of the constitution of the present invention, its constitution is not specifically limited so long as it doesn't conflict with the main part of the present invention. Therefore, the positive electrode may take a known or arbitrary constitution.

For example, if the nonaqueous electrolytic solution battery is a lithium ion battery, the positive electrode may be formed by a process which comprises mixing at least one of $LiCoO_2$, $LiNiO_2$ and $LiMn_2O_4$ as an active positive electrode material, an electrically conducting aid and a binder, adding a solvent to the mixture to make a paste-like compound, applying the paste-like compound thus prepared to both sides of an aluminum foil as an electronic collector for a positive electrode, drying the coated material, and then compression-molding the coated material by a roll press.

7. Negative electrode in nonaqueous electrolytic solution battery

Since the negative electrode is not a main part of the constitution of the present invention, its constitution is not specifically limited so long as it doesn't conflict with the main part of the present invention. Therefore, the negative electrode may take a known or arbitrary constitution.

For example, if the nonaqueous electrolytic solution battery is a lithium ion battery, any carbon material which can reversibly occlude/release lithium ion, such as graphitizing carbon, non-graphitizing carbon and graphitized material may be used. The negative electrode may be prepared by a process which comprises mixing at least one of these active negative electrode materials and a binder, adding a solvent to the mixture to prepare a paste-like compound, applying the paste-like compound to both sides of a copper foil as an electronic collector for a negative electrode, drying the coated material, and then compression-molding the coated material by a roll press.

In the foregoing nonaqueous electrolytic solution battery which is a lithium ion battery, either the positive electrode or the negative electrode may comprise metallic lithium instead of the foregoing active electrode material.

8. Constitution of nonaqueous electrolytic solution battery

Since the entire battery is not a main part of the constitution of the present invention, its constitution is not specifically limited so long as it doesn't conflict with the main part of the present invention. Therefore, the entire battery may take a known or arbitrary constitution.

Referring to battery shape, for example, the battery may be cylindrical, rectangular or like. In order to form a cylindrical battery, an ordinary method may be used which comprises cylindrically winding a positive electrode and a negative electrode with a separator interposed therebetween, putting the coil into a battery can, and then injecting an electrolytic solution into the battery can.

The present invention will be further described in the following examples, which are given by way of illustration only and thus are not limitative of the present invention.

EXAMPLE 1

To 50 ml of an electrolytic solution (1 mol/l solution of $LiPF_6$ in a 1:1 mixture of EC and DEC) produced by Mitsubishi Chemical Corporation were added 500 ppm of an ion-exchanged distilled water and 1,1,3,3,5,5-hexamethylcyclotrisilazane (produced by Chisso Corporation; hereinafter referred to as "HMTS") in an amount of 1.4 mols per mol of the ion-exchanged distilled water. The mixture was then sealed in a sample bottle. The sample was then allowed to stand at room temperature for 7 days. The sample electrolytic solution was then titrated by acid-base titration with a 0.1 mol/l aqueous solution of NaOH (produced by Wako Pure Chemical Industries, Ltd.) to determine the amount of acid therein.

Separately, for comparison, a sample prepared in the same manner as above except that HMTS was not added was subjected to determination in the same manner as mentioned above.

As a result, hydrofluoric acid was detected in an amount of twice the mol of water added in the sample free of HMTS while no hydrofluoric acid was detected in the sample comprising HMTS incorporated therein.

EXAMPLE 2

The procedure of Example 1 was followed except that 1,1,1,3,3,3-hexamethyldisilazane (produced by Chisso Corporation; hereinafter referred to as "HMDS") was used instead of HMTS in an amount equimolecular with HMTS.

As a result, hydrofluoric acid was detected in an amount of twice the mol of water added in the sample free of HMDS while no hydrofluoric acid was detected in the sample comprising HMDS incorporated therein.

EXAMPLE 3

18.5 parts by weight of $LiMn_2O_4$ (produced by The Honjo Chemical Corporation), 1.5 parts by weight of acetylene black (produced by Tokai Carbon Co., Ltd.), 8 parts by weight of a polyvinylidene fluoride powder (produced by Kureha Chemical Industry Co., Ltd.) and 72 parts by weight of N-methylpyrrolidone (produced by Wako Pure Chemical Industries, Ltd.) were thoroughly mixed to obtain a slurry.

The slurry thus obtained was applied to an aluminum foil having a thickness of 20 $\mu$m (positive electrode collector) by means of an applicator, dried, and then pressed to obtain a positive electrode material having a thickness of 160 $\mu$m having $LiMn_2O_4$ applied to both sides thereof.

Separately, 100 parts by weight of graphite (MCMB, produced by Osaka Gas Co., Ltd.) were thoroughly mixed with 100 parts by weight of a solution of 10 parts by weight of a polyvinylidene fluoride powder in 100 parts by weight of N-methylpyrrolidone to obtain a slurry. The slurry thus obtained was applied to a copper foil having a thickness of 10 $\mu$m (negative electrode collector) by means of an applicator, dried, and then pressed to obtain a negative electrode material having a thickness of 100 $\mu$m having a carbon material applied to both sides thereof.

A disc having a diameter of 15 mm stamped out from the foregoing positive electrode material was used as a positive electrode. A disc having a diameter of 17 mm stamped out from the negative electrode material was used as a negative electrode. A disc having a diameter of 19.5 mm stamped out from a polyethylene separator (produced by Tonen Chemical Corporation) was used as a separator. The positive electrode and the negative electrode were arranged opposed to each other with the separator interposed therebetween to prepare a coin-shaped battery.

Into the battery was then injected an electrolytic solution obtained by a method which comprises adding 500 ppm of ion-exchanged distilled water and HMTS (produced by Chisso Corporation) in an amount of 1.4 mols per mol of ion-exchanged distilled water to a 1 mol/l solution of $LiPF_6$ in a 1:1 mixture of EC and DEC, and then heating the mixture to a temperature of 60° C. for 96 hours. The battery was then sealed to prepare a sample battery of the present example.

Separately, a comparative sample battery was prepared in the same manner as above except that HMTS was not used.

The sample battery of the present example and the comparative sample battery were then charged at a constant current of 1 $mA/cm^2$ until the battery voltage reached 4.2 V, at a constant voltage of 4.2 V for a period of time to make 6 hours in total, and then discharged at a constant current of 0.5 $MA/cm^2$ until the battery voltage reached 3.0 V to finish one charge-discharge cycle. This cycle was then repeated to effect a cycle deterioration test.

The results are set forth in FIG. 1. The results show that the addition of HMTS provides a remarkable improvement in the cycle characteristics of the battery.

EXAMPLE 4

A sample battery was prepared in the same manner as in Example 3 except that HMDS (produced by Chisso Corporation) was used instead of HMTS in an amount equimolecular with HMTS. The sample battery thus prepared was then subjected to cycle deterioration test.

Figure 2:
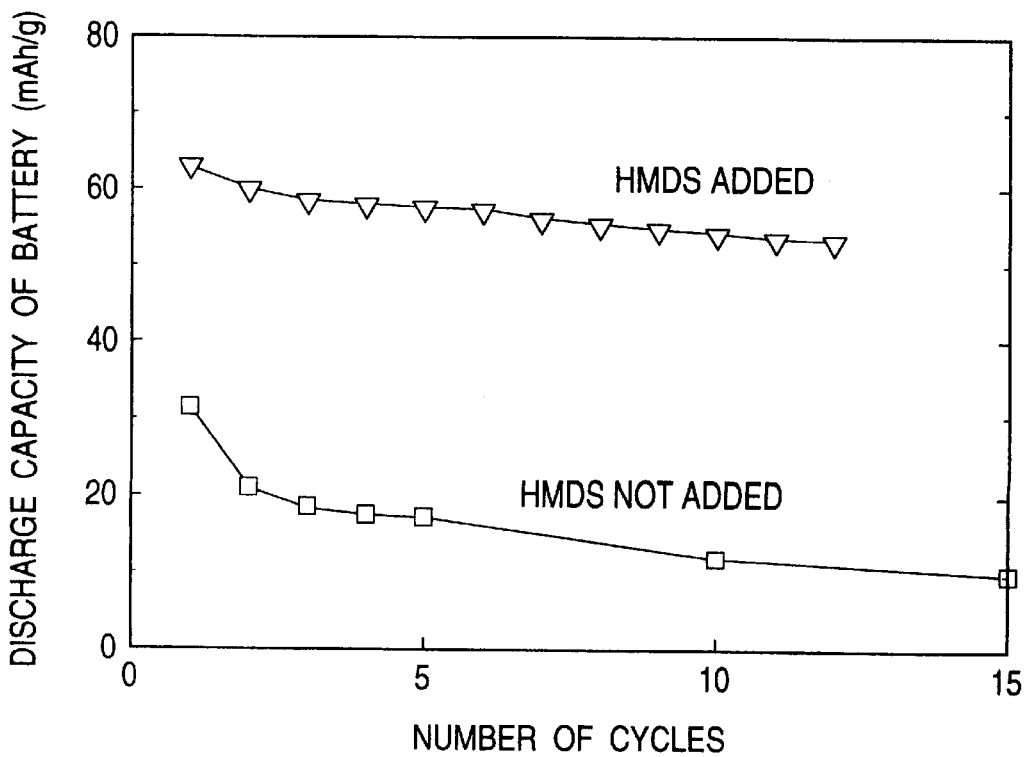
FIG. 2 is a diagram illustrating the charge-discharge cycle characteristics of another example of the present invention and another comparative example.

The results are set forth in FIG. 2. The results show that the addition of HMDS provides a remarkable improvement in the cycle characteristics of the battery.

EXAMPLE 5

A sample battery was prepared in the same manner as in Example 3 except that N,O-bis(trimethylsilyl)acetamide (produced by Chisso Corporation; hereinafter referred to as "BSA") was used instead of HMTS in an amount equimolecular with HMTS. The sample battery thus prepared was then subjected to cycle deterioration test.

Figure 3:
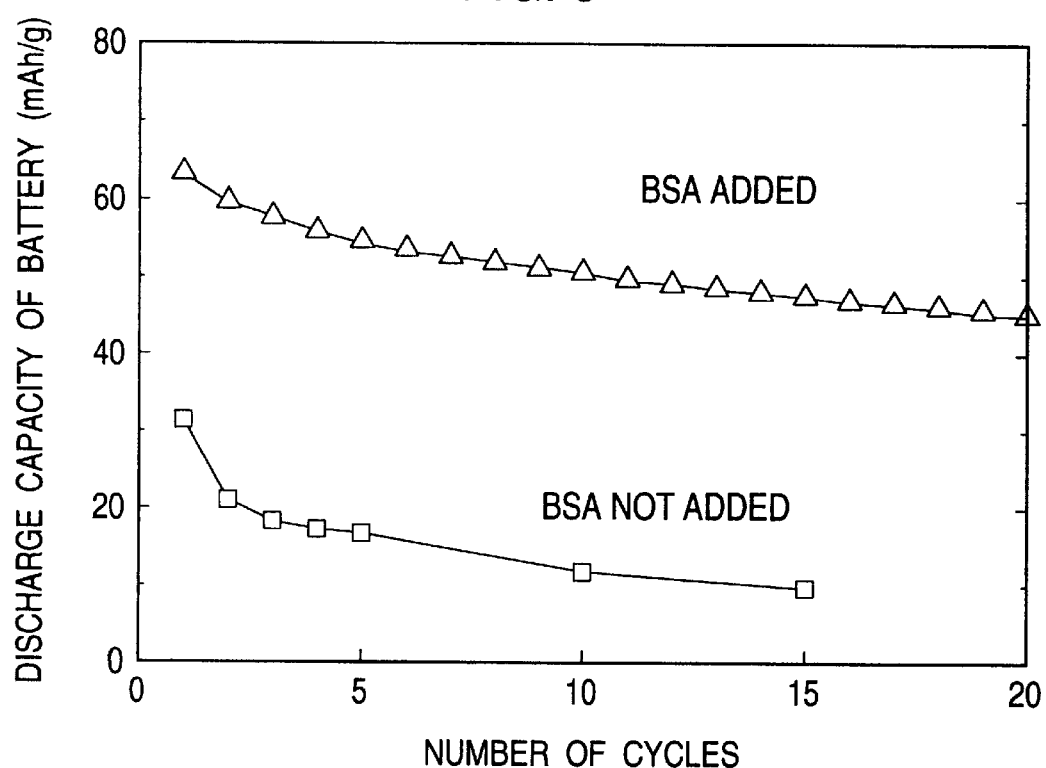
FIG. 3 is a diagram illustrating the charge-discharge cycle characteristics of a further example of the present invention and a further comparative example.

The results are set forth in FIG. 3. The results show that the addition of BSA provides a remarkable improvement in the cycle characteristics of the battery.

EXAMPLE 6

A sample battery was prepared in the same manner as in Example 3 except that (N,N-diethylamino)trimethylsilane (produced by Chisso Corporation; hereinafter referred to as "DEATMS") was used instead of HMTS in an amount equimolecular with HMTS. The sample battery thus prepared was then subjected to cycle deterioration test.

Figure 4:
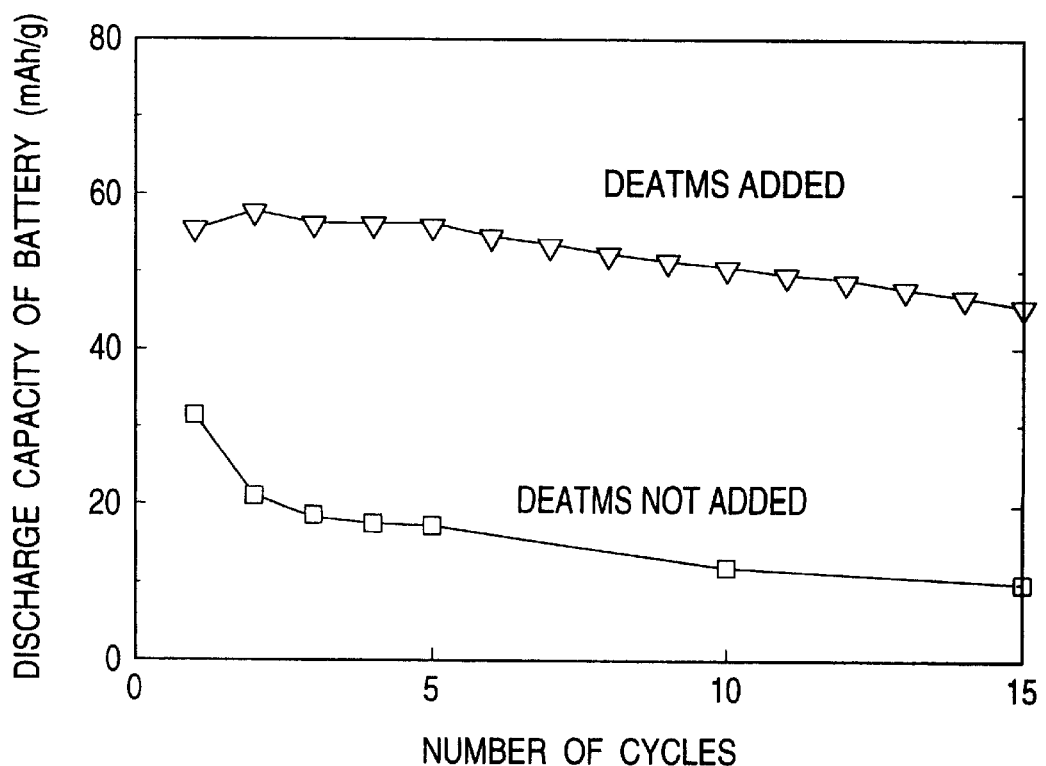
FIG. 4 is a diagram illustrating the charge-discharge cycle characteristics of a further example of the present invention and a further comparative example.

The results are set forth in FIG. 4. The results show that the addition of DEATMS provides a remarkable improvement in the cycle characteristics of the battery.

EXAMPLE 7

To 50 ml of an electrolytic solution (1 mol/l solution of $LiPF_6$ in a 1:1 mixture of EC and DEC) produced by Mitsubishi Chemical Corporation were added 500 ppm of an ion-exchanged distilled water and N,N-dimethylformamide dimethylacetal (produced by Tokyo Kasei Kogyo Co., Ltd.) in an amount of 2 mols per mol of the ion-exchanged distilled water. The mixture was then sealed in a sample bottle. The sample was then allowed to stand at room temperature for 7 days. The sample electrolytic solution was then titrated by acid-base titration with a 0.1 mol/l aqueous solution of NaOH (produced by Wako Pure Chemical Industries, Ltd.) to determine the amount of acid therein.

Separately, for comparison, a sample prepared in the same manner as above except that N,N-dimethylformamide dimethylacetal was not added was subjected to determination in the same manner as mentioned above.

As a result, hydrofluoric acid was detected in an amount of twice the mol of water added in the comparative sample while no hydrofluoric acid was detected in the sample comprising N,N-dimethylformamidedimethylacetal incorporated therein

EXAMPLE 8

The procedure of Example 7 was followed except that benzaldehydedimethylacetal (produced by Tokyo Kasei Kogyo Co., Ltd.) was used instead of N,N-dimethylformamide dimethylacetal in an amount equimolecular with N,N-dimethylformamidedimethylacetal.

As a result, hydrofluoric acid was detected in an amount of twice the mol of water added in the sample while no hydrofluoric acid was detected in the sample comprising benzaldehydedimethylacetal incorporated therein.

EXAMPLE 9

18.5 parts by weight of $LiMn_2O_4$ (produced by The Honjo Chemical Corporation), 1.5 parts by weight of acetylene black (produced by Tokai Carbon Co., Ltd.), 8 parts by weight of a polyvinylidene fluoride powder (produced by Kureha Chemical Industry Co., Ltd.) and 72 parts by weight of N-methylpyrrolidone (produced by Wako Pure Chemical Industries, Ltd.) were thoroughly mixed to obtain a slurry.

The slurry thus obtained was applied to an aluminum foil having a thickness of 20 $\mu$m (positive electrode collector) by means of an applicator, dried, and then pressed to obtain a positive electrode material having a thickness of 160 $\mu$m having $LiMn_2O_4$ applied to both sides thereof.

Separately, 100 parts by weight of graphite (MCMB, produced by Osaka Gas Co., Ltd.) were thoroughly mixed with 100 parts by weight of a solution of 10 parts by weight of a polyvinylidene fluoride powder in 100 parts by weight of N-methylpyrrolidone to obtain a slurry. The slurry thus obtained was applied to a copper foil having a thickness of 10 $\mu$m (negative electrode collector) by means of an applicator, dried, and then pressed to obtain a negative electrode material having a thickness of 100 $\mu$m having a carbon material applied to both sides thereof.

A disc having a diameter of 15 mm stamped out from the foregoing positive electrode material was used as a positive electrode. A disc having a diameter of 17 mm stamped out from the negative electrode material was used as a negative electrode. A disc having a diameter of 19.5 mm stamped out from a polyethylene separator (produced by Tonen Chemical Corporation) was used as a separator. The positive electrode and the negative electrode were arranged opposed to each other with the separator interposed therebetween to prepare a coin-shaped battery.

Into the battery was then injected an electrolytic solution obtained by a method which comprises adding 500 ppm of ion-exchanged distilled water and N,N-dimethylformamide dimethylacetal (produced by Tokyo Kasei Kogyo Co., Ltd.) in an amount equimolecular with the ion-exchanged distilled water to a 1 mol/l solution of LiPF$_6$ in a 1:1 mixture of EC and DEC, and then heating the mixture to a temperature of 60° C. for 96 hours. The battery was then sealed to prepare a sample battery of the present example.

Separately, a comparative sample battery was prepared in the same manner as above except that N,N-dimethyl formamidedimethylacetal was not used.

The sample battery of the present example and the comparative sample battery were then charged at a constant current of 1 mA/cm$^2$ until the battery voltage reached 4.2 V, at a constant voltage of 4.2 V for a period of time to make 6 hours in total, and then discharged at a constant current of 0.5 mA/cm$^2$ until the battery voltage reached 3.0 V to finish one charge-discharge cycle. This cycle was then repeated to effect a cycle deterioration test.

Figure 5:
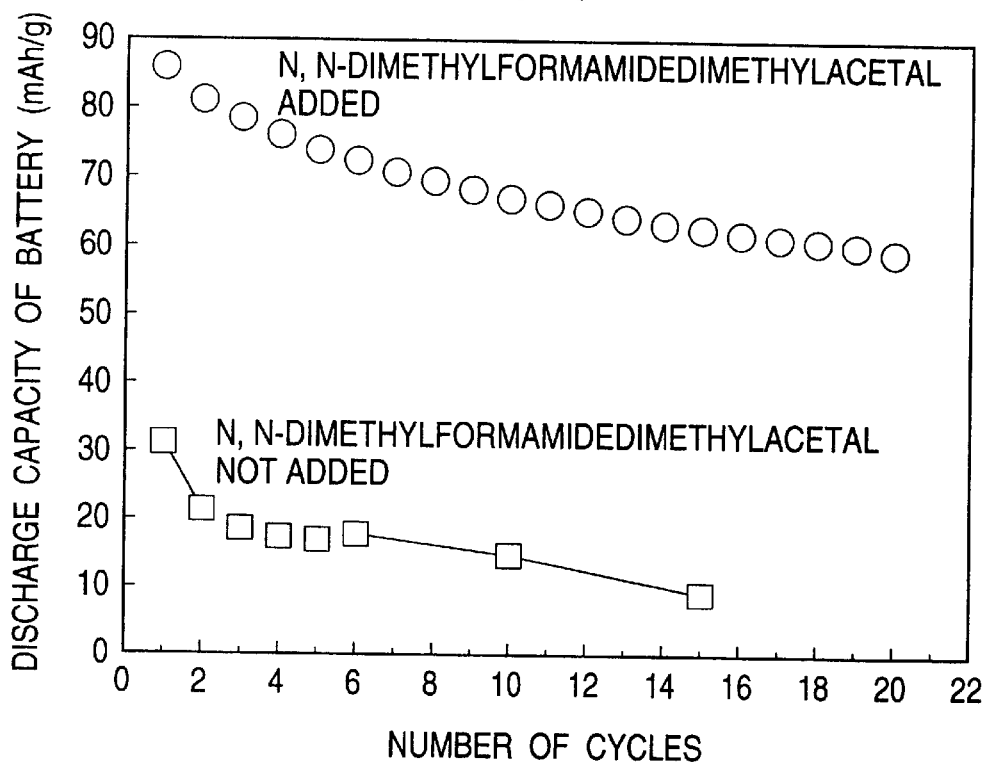
FIG. 5 is a diagram illustrating the charge-discharge cycle characteristics of a further example of the present invention and a further comparative example.

The results are set forth in FIG. 5. The results show that the addition of N,N-dimethylformamidedimethyl acetal provides a remarkable improvement in the cycle characteristics of the battery.

EXAMPLE 10

A sample battery was prepared in the same manner as in Example 9 except that N,N-dimethylformamidediisopropyl acetal (produced by Tokyo Kasei Kogyo Co., Ltd.) was used instead of N,N-dimethylformamidedimethylacetal in an amount equimolecular with N,N-dimethylformamidedimethylacetal. The sample battery thus prepared was then subjected to cycle deterioration test.

Figure 6:
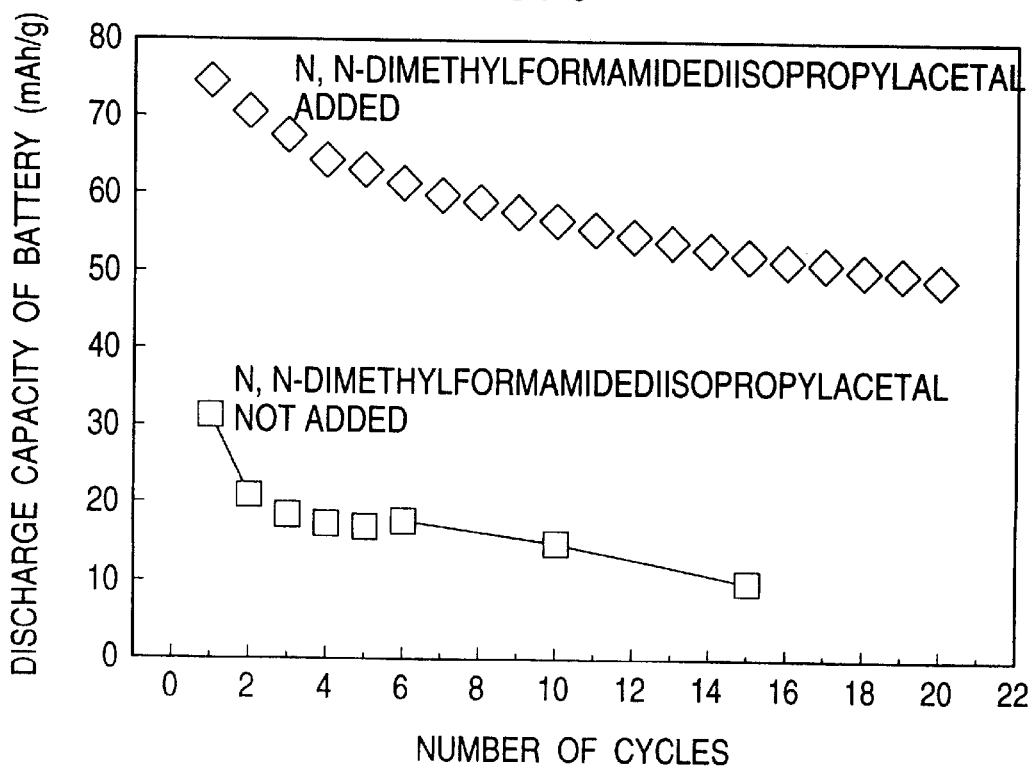
FIG. 6 is a diagram illustrating the charge-discharge cycle characteristics of a further example of the present invention and a further comparative example.

The results are set forth in FIG. 6. The results show that the addition of N,N-dimethylformamidediisopropyl acetal provides a remarkable improvement in the cycle characteristics of the battery.

EXAMPLE 11

A sample battery was prepared in the same manner as in Example 9 except that N,N-dimethylformamidedi-n-butyl acetal (produced by Tokyo Kasei Kogyo Co., Ltd.) was used instead of N,N-dimethylformamidedimethylacetal in an amount equimolecular with N,N-dimethylformamidedimethylacetal. The sample battery thus prepared was then subjected to cycle deterioration test.

Figure 7:
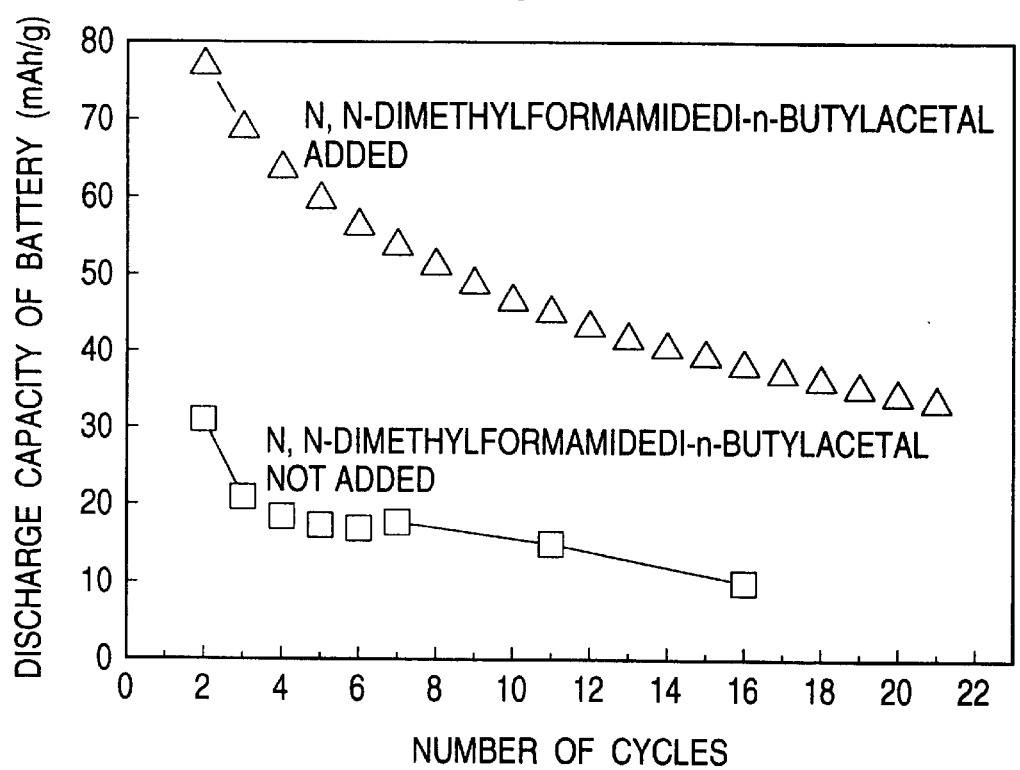
FIG. 7 is a diagram illustrating the charge-discharge cycle characteristics of a further example of the present invention and a further comparative example.

The results are set forth in FIG. 7. The results show that the addition of N,N-dimethylformamidedi-n-butyl acetal provides a remarkable improvement in the cycle characteristics of the battery.

EXAMPLE 12

A sample battery was prepared in the same manner as in Example 9 except that N,N-dimethylformamidedicyclohexyl acetal (produced by Tokyo Kasei Kogyo Co., Ltd.) was used instead of N,N-dimethylformamidedimethylacetal in an amount equimolecular with N,N-dimethylformamidedimethylacetal. The sample battery thus prepared was then subjected to cycle deterioration test.

Figure 8:
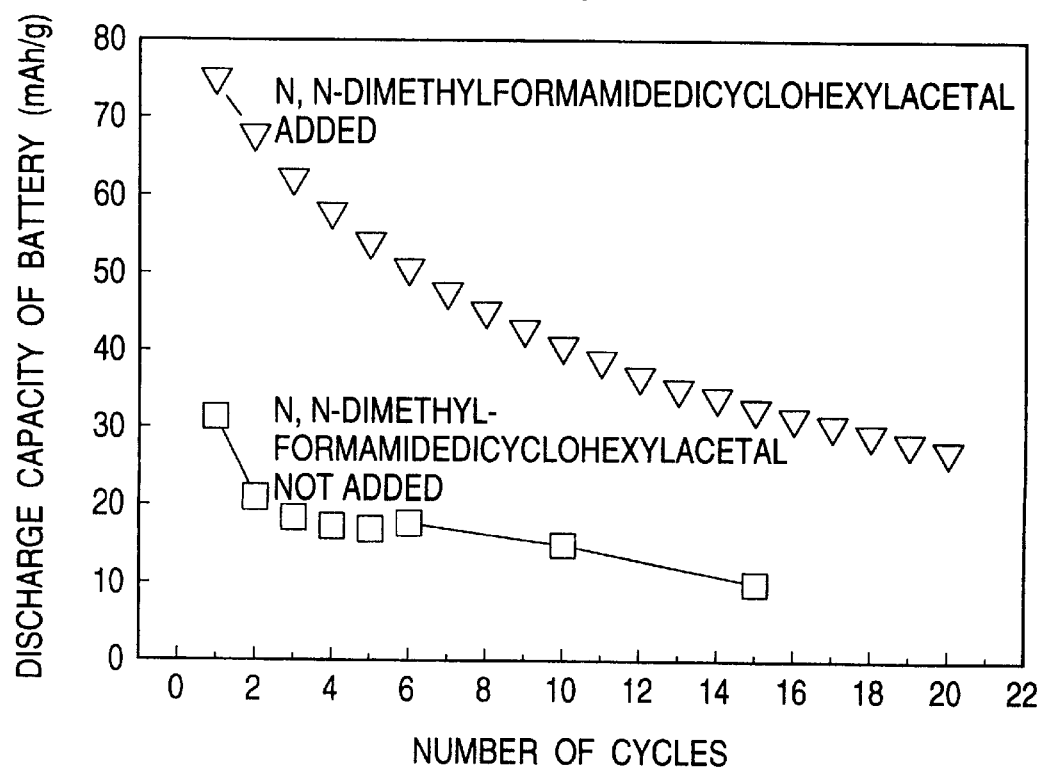
FIG. 8 is a diagram illustrating the charge-discharge cycle characteristics of a further example of the present invention and a further comparative example.

The results are set forth in FIG. 8. The results show that the addition of N,N-dimethylformamidedicyclohexyl acetal provides a remarkable improvement in the cycle characteristics of the battery.

While the invention has been described in detail and with reference to specific embodiments thereof, it will be apparent to one skilled in the art that various changes and modifications can be made therein without departing from the spirit and scope thereof.

What is claimed is:

1. A nonaqueous electrolytic solution for a battery, comprising:
   an organic solvent;
   a supporting electrolyte; and
   an organic compound capable of scavenging water by decomposing said water without formation of an acid,
   wherein said organic compound is an organosilicon compound having an Si-N bond which scavenges said water and a hydrogen halide by-product by decomposing said water and said hydrogen halide.

2. The nonaqueous electrolytic solution for a battery as claimed in claim 1, wherein said organosilicon compound having an Si-N bond is incorporated in the nonaqueous electrolytic solution in an amount of from 1 mmol to 0.5 mol per e of the nonaqueous electrolytic solution.

3. The nonaqueous electrolytic solution for a battery as claimed in claim 1, wherein said supporting electrolyte is at least one selected from the group consisting of LiPF$_6$, LiBF$_4$, and LiClO$_4$.

4. The nonaqueous electrolytic solution for a battery as claimed in claim 1, wherein said organosilicon compound having an Si-N bond is at least one selected from the group consisting of an organosilazane compound, an organodisilazane compound and an organotrisilazane compound.

5. A nonaqueous electrolytic solution for a battery, comprising:
   an organic solvent;
   a supporting electrolyte; and
   an organic compound capable of scavenging water by decomposing said water without formation of an acid, wherein said organic compound is an acetal compound which reacts with said water to decompose said water, and wherein said acetal compound is one represented by the following general formula (VI):

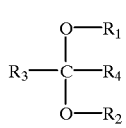

(VI)

wherein R$_1$ and R$_2$ may be the same or different and each represent a hydrocarbon group having at least one carbon atom; and R$_3$ and R$_4$ may be the same or different and each represent a hydrocarbon group having at least one carbon atom, an amino group or an alkylamino group or a hydrogen atom, with the proviso that if one of R$_3$ and R$_4$ is a hydrogen atom, then the other one of R$_3$ and R$_4$ is not a hydrogen atom, wherein said acetal compound is incorporated in the nonaqueous electrolytic solution in an amount of from 1 mmol to 0.5 mol per 1 of the nonaqueous electrolytic solution.

6. A nonaqueous electrolytic solution battery, comprising an active electrode material of lithium or a compound thereof; and the nonaqueous electrolytic solution of claim 5.

7. The nonaqueous electrolytic solution for a battery as claimed in claim 5, wherein said supporting electrolyte is at least one selected from the group consisting of LiPF$_6$, LiBF$_4$, and LiClO$_4$.

8. A nonaqueous electrolytic solution battery, comprising an active electrode material of lithium or a compound thereof, and a nonaqueous electrolytic solution comprising an organic solvent, a supporting electrolyte and an organosilicon compound having an Si-N bond which scavenges water and a hydrogen halide by-product by decomposing said water and said hydrogen halide.

9. A nonaqueous electrolytic solution for a battery, comprising:
an organic solvent;
a supporting electrolyte; and
an organic compound capable of scavenging water by decomposing said water without formation of an acid, wherein said organic compound is an acetal compound which reacts with said water to decompose said water, and wherein said acetal compound is one represented by the following general formula (VI):

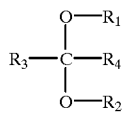

(VI)

wherein $R_1$ and $R_2$ may be the same or different and each represent a hydrocarbon group having at least one carbon atom; and $R_3$ and $R_4$ may be the same or different and each represent a hydrocarbon group having at least one carbon atom, an amino group or an alkylamino group, with the proviso that if one of $R_3$ and $R_4$ is a hydrogen atom, than and the one of $R_3$ and $R_4$ which is not a hydrogen atom is an alkylamino group.

10. The nonaqueous electrolytic solution for a battery as claimed in claim 9, wherein the acetal compound is a N,N-dimethylformamidedialkylacetal.

11. The nonaqueous electrolytic solution for a battery as claimed in claim 10, wherein the N,N-dimethylformamidedialkylacetal is N,N-dimethylformamidedimethylacetal or N,N-dimethylformamidedicyclohexylacetal.

12. The nonaqueous electrolytic solution for a battery as claimed in claim 9, wherein the acetal compound is benzaldehydedimethylacetal.

13. A nonaqueous electrolytic solution battery, comprising an active electrode material of lithium or a compound thereof; and a nonaqueous electrolytic solution comprising an organic solvent, a supporting electrolyte and an acetal compound which scavenges water by decomposing said water, and wherein said acetal compound is one represented by the following general formula (VI):

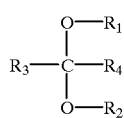

(VI)

wherein $R_1$ and $R_2$ may be the same or different and each represent a hydrocarbon group having at least one carbon atom; and $R_3$ and $R_4$ may be the same or different and each represent a hydrocarbon group having at least one carbon atom, an amino group or an alkylamino group, with the proviso that if one of $R_3$ and $R_4$ is a hydrogen atom, than the one of $R_3$ and $R_4$ which is not a hydrogen atom is an alkylamino group.

14. The nonaqueous electrolytic solution battery as claimed in claim 13, wherein the acetal compound is a N,N-dimethylformamidedialkylacetal.

15. The nonaqueous electrolytic solution battery as claimed in claim 14, wherein the N,N-dimethylformamidedialkylacetal is N,N-dimethylformamidedimethylacetal or N,N-dimethylformamidedicyclohexylacetal.

16. A The nonaqueous electrolytic solution battery as claimed in claim 13, wherein the acetal compound is benzaldehydedimethylacetal.

* * * * *